Dec. 11, 1934.                G. FAST                 1,984,337
                          FRICTION CLUTCH
                       Filed Feb. 4, 1930.        3 Sheets-Sheet 1
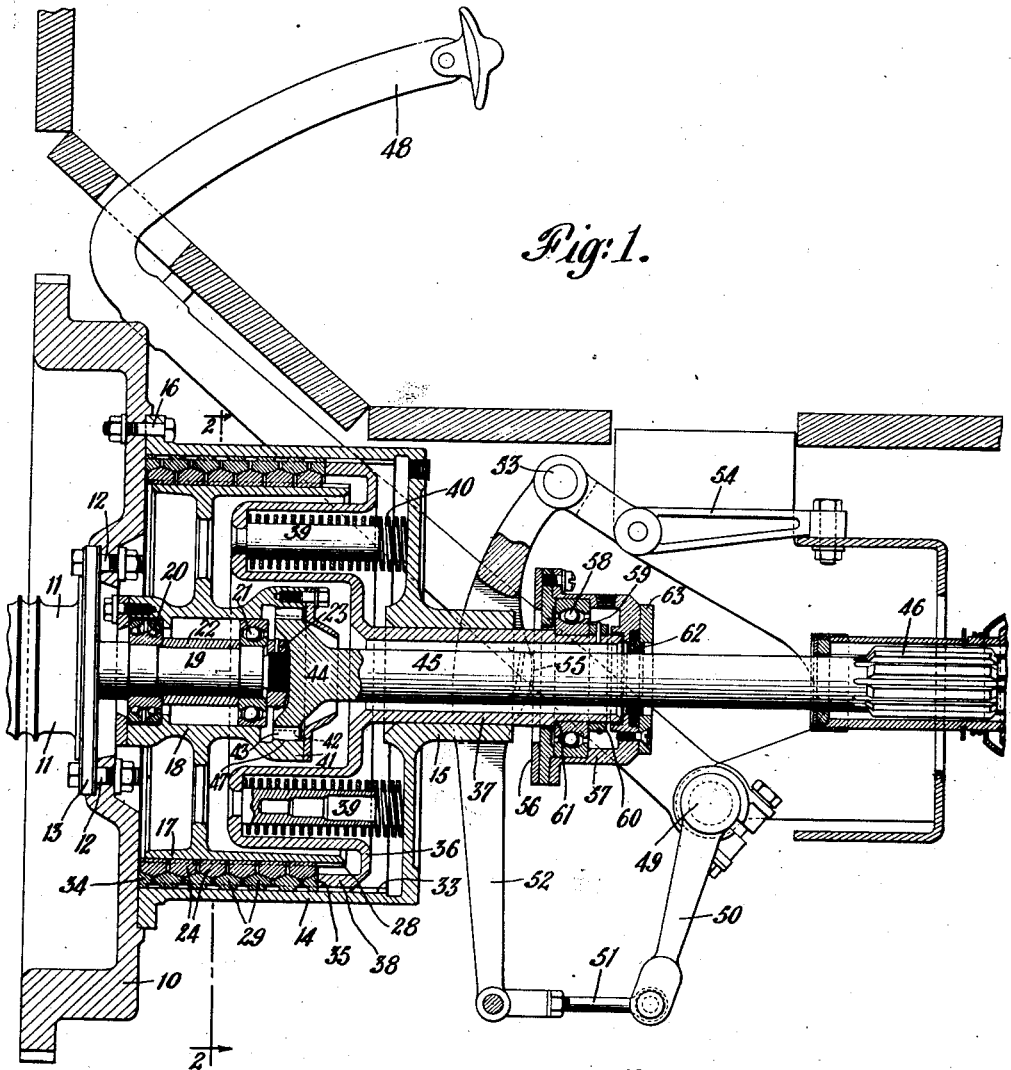
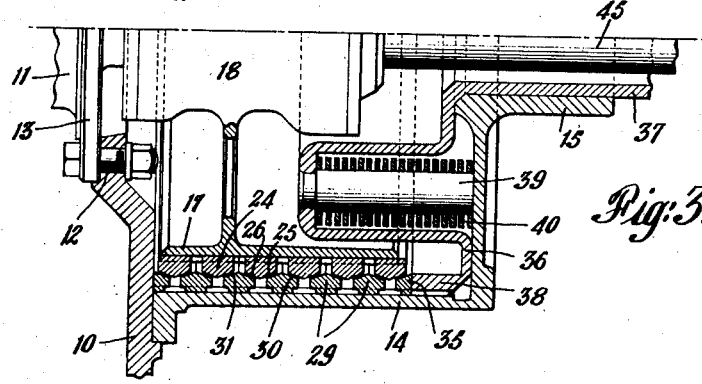
INVENTOR
Gustave Fast
BY
ATTORNEY Dec. 11, 1934.　　　　　G. FAST　　　　　1,984,337
FRICTION CLUTCH
Filed Feb. 4, 1930　　　3 Sheets-Sheet 2
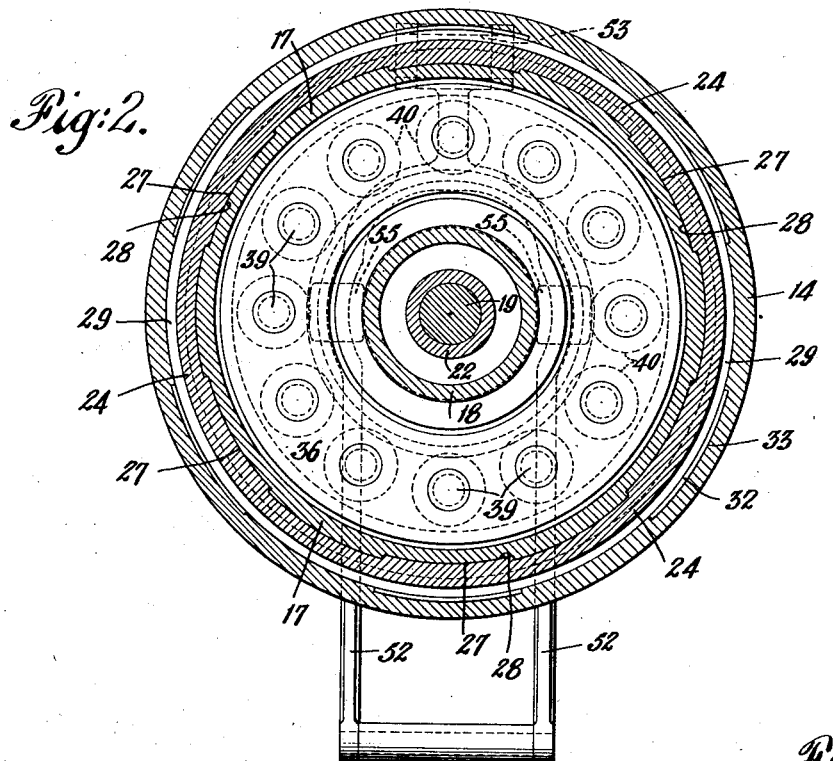
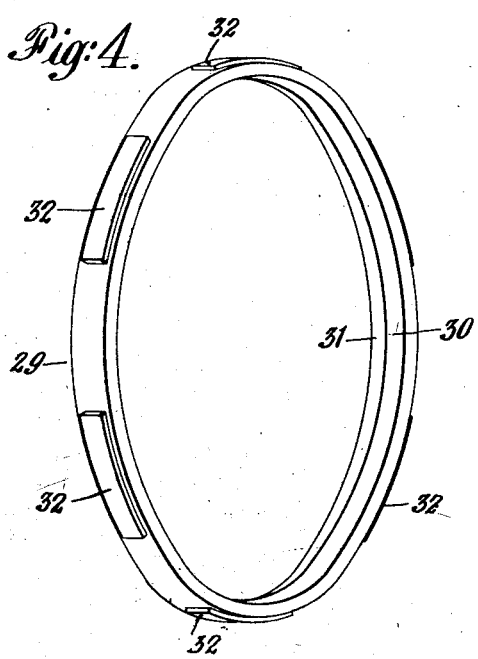
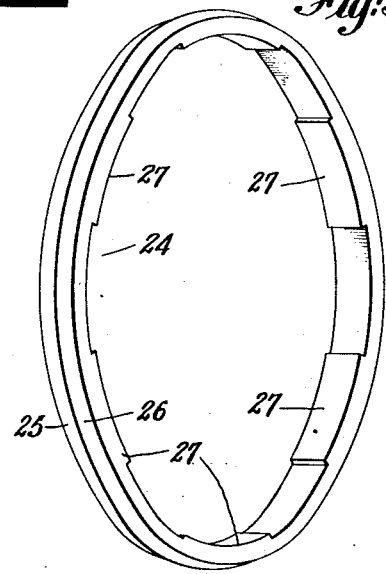
INVENTOR
Gustave Fast
BY
ATTORNEY Dec. 11, 1934.   G. FAST   1,984,337
FRICTION CLUTCH
Filed Feb. 4, 1930   3 Sheets-Sheet 3
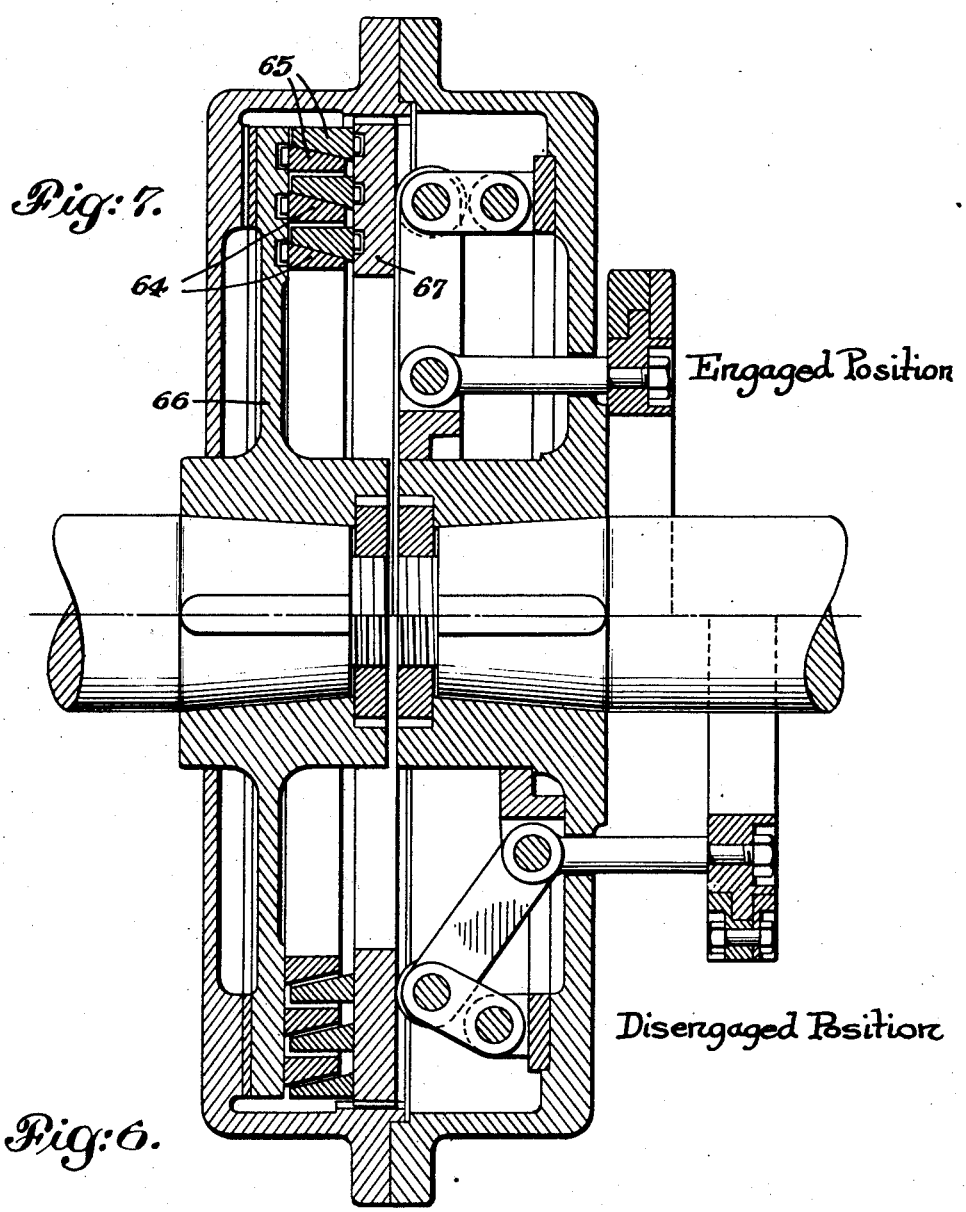
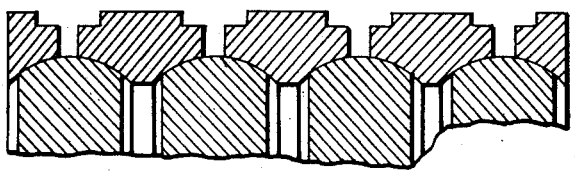
Inventor:
Gustave Fast
by H. C. Lliening
Attorney Patented Dec. 11, 1934

1,984,337

UNITED STATES PATENT OFFICE 1,984,337

FRICTION CLUTCH

Gustave Fast, Annapolis, Md., assignor to Gustave Fast Engineering Corporation, Annapolis, Md., a corporation of Maryland Application February 4, 1930, Serial No. 425,758

14 Claims. (Cl. 192—72)

This invention relates to improvements in clutch constructions of the friction type in which power is transmitted from a driving member to a driven member through frictional elements co-operating between the two members. It is particularly suited to the connection and disconnection of the driving and driven parts of automobiles, machine tools and other heavy machinery, or the like, adapted to be controlled manually or by a foot pedal, or other suitable means. In the construction contemplated the frictional elements are adapted to be brought together under a variable force which may vary from no force at all to any desired maximum.

An object of the invention has been to provide a clutch of the type indicated in which all of the friction elements co-operate in a uniform and efficient manner in the transmission of power and in which the pressure forces between the surfaces which create the desired friction are evenly distributed throughout the friction bodies.

One important feature of the invention is the employment of friction members having a high degree of resiliency or elasticity. In the utilization of the resilient or elastic qualities of the friction members it is contemplated to set up the molecular forces incidental to the resilience of the material in opposition to the pressures between the friction surfaces so that a spring action is obtained. This action is of considerable magnitude and brings about an almost instantaneous disengagement of the friction surfaces or release of pressure between such surfaces whenever it is desired to throw the clutch out of operation by manual or other means. A more specific phase of the invention in this connection is the provision of a plurality of co-operating friction rings formed of suitable resilient or elastic material, certain of the rings being subjected to forces tending to expand them while others are subjected to compressional forces. All of the rings are, due to their co-operation, placed under substantial stresses and strains which serve to store in the rings a considerable amount of molecular or stress-strain energy which comes into play upon the subsequent release of the clutch. This energy, as has already been mentioned, serves to cause a speedy disconnection of all of the co-operating friction surfaces. It also makes it possible to obtain good contact between the parts.

With respect to this phase of the invention, it is of great importance to select materials in the construction of the rings which will have a high degree of resilience or a large capacity for the storage of the molecular forces mentioned under the different types of strains and stresses to which the different members may be subjected. Thus, certain of the members should be particularly adapted to store energy incident to compressive stresses and strains whereas others of the members should be particularly adapted to the storage of energy incident to the tensile or expanding forces.

It is important, in order that the full efficiency of the construction may be obtained, to so arrange the co-operating pressure surfaces of the rings that the forces acting between them are evenly distributed and transmitted uniformly to all parts. Due to the flexibility and resilience or elasticity of the friction members as contemplated by the present invention, they adapt themselves readily to slight irregularities and variations in the co-operating surfaces and thereby bring about the advantages mentioned to a high degree. As a result of the efficiency of the construction, it is possible to transmit a relatively large torque for a clutch of a given size.

Other objects and advantages of the invention will be made apparent from the detailed description which will now be given in conjunction with the accompanying drawings, in which:

Figure 1 is a vertical sectional view taken longitudinally through the mechanism.

Figure 2 is a vertical sectional view on the line 2—2 of Figure 1 showing the clutch construction.

Figure 3 is an enlarged fragmentary view showing the clutch rings disengaged.

Figure 4 is a perspective view of one of the outer clutch rings employed in this construction.

Figure 5 is a similar perspective view of one of the inner clutch rings.

Figure 6 is an enlarged sectional view taken through a group of friction rings illustrating the use of a modified form of ring; and Figure 7 is a vertical sectional view through a modified form of clutch in which the friction rings are disposed in a vertical plane. The upper portion of this figure indicates the position of the rings when the clutch is engaged and the lower portion indicates the position of the rings when the clutch is disengaged.

Referring now to the drawings, the invention has been disclosed as applied to an automobile for the transmission of power from the crank shaft to the transmission devices. It is to be understood, however, that this is only one illustrative use to which the features of the invention may be put and that they are readily capable of application to the coupling and uncoupling of driving and driven members of all sorts of machines.

As applied to an automobile, there may be provided a fly-wheel 10 which is secured in any suitable way to a crank shaft 11. The connection between these parts may be by way of bolts 12 passing through a face-plate 13 secured to the shaft and through a portion of the wall of the fly-wheel. On the opposite face of the fly-wheel there may be mounted a housing 14 having a horizontal extension 15 provided with an opening in line with the shaft 11. The housing may be secured to the fly-wheel in any suitable way, as by means of the bolts 16 indicated. Within the housing there may be provided a cylindrical shell 17 having its outer wall spaced some distance from the inner wall of the housing. This shell may be mounted as by means of radial arms on a central hub 18 which surrounds an extension 19 of the shaft 11. The hub 18 may be supported on the extension 19 in any convenient way, as by means of a pair of ball or roller bearings 20 and 21, as indicated in Figure 1. These bearings may be held in suitably spaced relation by means of a spacing collar or sleeve 22 and may be held in proper position on the extension 19 by means of a nut 23.

On the outer surface of the shell 17 there may be mounted any desired number of friction rings 24 having substantially vertical end faces and having their outer surfaces in the form of two oppositely inclined or tapered faces 25 and 26. As indicated, the surfaces 25 and 26 may advantageously be inclined about 15 or 20 degrees to the horizontal and may merge substantially at a plane passing through the mid-portion of the ring. It is to be understood, however, that the particular angle mentioned may be varied within considerable limits and it is specified merely by way of illustration. Preferably the surfaces should be at a smaller angle to the axis of the rings than to a plane which is perpendicular to such axis.

The inner surfaces of the rings 24 may be cut away at a plurality of points to provide a number of arcuate extensions 27 (Fig. 5) adapted to co-operate with grooves 28 of substantially the same width formed in the outer surface of the shell 17 (Fig. 2). In lieu of the foregoing construction, any other suitable connection may be provided, if desired, between the rings 24 and the shell 17 which will permit longitudinal movement of the rings along the surface of the shell and at the same time prevent relative angular movement between these parts.

Outside of the rings 24, and bridging the gaps between adjacent ones of the inner rings, there may be provided a series of outer rings 29 of substantially the same but inverted form in cross section, being provided with inwardly facing tapered or inclined surfaces 30 and 31 co-operating respectively with the surfaces 26 and 25 of the inner rings. These outer rings may be provided with arcuate extensions 32 adapted to fit into complementally formed grooves in the interior surface of the housing 14 so that these outer rings may be shifted longitudinally of the housing but may not partake of any substantial angular movement relative to the housing. On the outer ends of the group of rings 29 there may be provided a pair of rings 34 and 35, each of which corresponds to a half portion of one of the rings 29. One of the vertical faces of the ring 34 may be adapted to co-operate with the opposed wall of the fly-wheel 10. In a similar way one vertical wall of the ring 35 may co-operate with an annular surface formed on an element 36 which may be in the nature of a quill diaphragm and have the peculiar form indicated in the drawings. This element in cross section, as shown, consists of a series of concentric cylindrical portions joined together by annular vertical walls and is adapted as a whole to fit between and house various portions of the adjacent structure. An extension 37 of the element 36 passes through the opening in the extension 15 of the housing and preferably is supported by engagement with the latter. The outermost cylindrical portion 38 of the element is provided with arcuate projections adapted to co-operate with the grooves 33 in the inner surface of the housing 14 so that the element and housing may have relative longitudinal movement but will turn together.

A plurality of posts 39, riveted or otherwise secured to one of the vertical walls of the element 36, may extend horizontally between a pair of the cylindrical walls of the element and may support a corresponding number of springs 40 adapted to be compressed between the inner vertical wall of the housing 14 and the vertical annular wall of the element. The series of springs 40, therefore, will serve to normally shift the element 36 toward the left, in Figure 1, so that the annular surface at the end of the portion 38 will engage the ring 35 and force the latter toward the left, thereby pressing together all of the remaining rings 24, 29 and 34. At this time the surface 31 of the ring 35 will have a camming or wedging action with respect to the surface 25 of the adjacent ring 24 so that, in addition to forcing the latter longitudinally, it will compress the latter in all directions toward the center. Due to the resilience or elasticity of the material of which the ring 24 is formed, a certain amount of molecular or stress-strain energy will be stored in this ring as a result of the compressive force. In a similar way the resilience of the ring 35, permitting a partial expansion of this ring, under the tensile stress arising from the camming or wedging action, will serve to store up molecular energy or stress-strain in this ring. It will be apparent that in a similar way the longitudinal movement of the first ring 24 toward the left, in Figure 1, will set up a corresponding action between its surface 26 and the surface 30 of the adjacent outer ring and corresponding forces will be transmitted throughout and set up in all of the rings. Therefore, under normal conditions, when the springs 40 are permitted to act freely, a considerable pressure will be exerted between all of the co-operating surfaces of the friction rings so that the rotational movements of the fly-wheel 10 and housing 14 will be transmitted to the shell 17 and hub 18.

The arrangement of the co-operating surfaces 25, 26, 30 and 31 is such that the pressure forces which result in the production of friction are evenly distributed over all of these surfaces and the distorting forces acting on the rings are uniformly transmitted to all parts of the latter. In order to insure the best and most efficient results the materials of which the various rings are made should be carefully selected for their resiliency under particular types of stress. For example the rings 24 should be formed of some material which is highly resilient under compressional forces while the other rings should be highly resilient under tensile or expanding forces. It will be found advantageous, with this in view, to form the rings 24 of cast iron and the outer rings of forged steel. This combination of materials, furthermore, has the advantage of providing good bearing and wear resisting surfaces which have little or no tendency to gall or seize. Obviously, any other combination of materials, or single material having the desired characteristics, may be employed.

Any suitable connections may be provided for transmitting the rotational movements of the hub 18 to the parts to be driven. These connections may comprise a belled extension 41 of the hub provided with driving teeth or inwardly extending projections 42 adapted to co-operate with spaces between corresponding projections 43 extending radially from an enlarged portion 44 of a shaft 45. The latter extends through the central opening in the extension 37 of the member 36. Any suitable means of connection may be provided between the shaft 45 and the parts to be driven, such as the transmission mechanism of an automobile. This connection may, for example, suitably take the form of a splined extension 46 of the shaft adapted to co-operate with an internally splined or toothed portion of the driven member. In order to permit a relative rocking movement between the shaft 45 and the hub 18, the outer ends of the projections 43 may be provided with curved surfaces 47 which are in the form of arcs having their center at the point of intersection of the axis of the shaft 45 with a vertical plane passing through the middle of the projections 43. This provides a universal connection which will permit adjustment of the shaft to slight misalignments caused by unevenness in the road over which the automobile is travelling or inaccurate assembly of the parts.

Now, when it is desired to disconnect the driving and driven members, the friction rings may be released by sliding the member 36 longitudinally toward the right, in Figure 1, within the housing. This may be effected in any suitable way, as by the provision of a foot pedal mounted on an arm 48 pivotally connected to the frame of the car, as by means of a stud 49. An arm 50 formed integrally with an extension of the pedal-operated arm 48, or otherwise connected therewith, is connected by means of an extensible link 51 with a clutch shifting yoke 52. The latter is pivotally carried by the frame of the machine, as by means of a stud 53 passing through the upper end of the yoke and into a bracket 54 secured to the main frame of the machine. A pair of arcuate surfaces 55, formed on the two arms of the yoke which straddle the extensions 15 and 37, are adapted to engage the surface 56 of a housing 57 mounted on the extension 37 near its extreme right end. The arcuate form of the surfaces 55 permits the desired free movement of the latter relative to the surface 56 as the housing slides longitudinally and the yoke is rocked. A ball or roller bearing construction 58 is preferably provided between the housing 57 and the extension 37 to permit free rotation of the extension within the housing. The inner bearing ring 59 may be secured to the end of the extension 37 in any suitable way, as by means of a nut 60 which serves to clamp the bearing against a shoulder 61 formed on the extension.

It will be apparent that when the pedal 48 is depressed or moved toward the left, in Figure 1, the arm 50 will serve to draw the link 51 toward the right and rock the yoke 52 counterclockwise so that the surfaces 55 thereof will engage the surface 56 of the housing 57 and slide the latter toward the right. This will serve to correspondingly shift the member 36 to the right and thereby compress the springs 40. As a result the pressure on the friction rings will be relieved and a portion of the molecular energy stored in these rings will become effective to bring about their instantaneous release. All of the friction surfaces are in this way disengaged or rendered ineffective substantially simultaneously. The housing 14 is preferably made oil-tight at all of its joints so that the friction rings may in part or in whole be immersed in a body of lubricant. This will bring about a highly desirable condition when the clutch is disengaged by operation of the foot pedal since the wear and resistance between the inner and outer rings, which at this time partake of relative rotary movement, will be reduced to a minimum. At the same time this lubrication will not interfere with the proper frictional engagement of the rings when the clutch is active. The annular passage between the shaft 45 and the extension 37 may be sealed off at its end by the provision of a washer 62 of any suitable material held in place by a retaining ring 63 or by the provision of a stuffing box, or the like, at this point. It will be understood, however, that while the clutch is admirably adapted to lubrication, its features may be employed, as well, in connection with a dry or non-lubricated form of clutch.

While one admirable embodiment of the invention has been described in considerable detail in the foregoing, it is to be understood that many modifications may be made in the construction of the various portions of the mechanism, and in their mode of co-operation, without departing from the spirit and scope of the invention. Although the friction elements have been shown and described as having a particular preferred form, it will be obvious that the co-operating surfaces may assume a spherical or almost any other regular or irregular form. A spherical formation is illustrated in Figure 6. It is important primarily that a wedging or camming action tending to set up molecular forces in the bodies of the elements should be produced upon relative movement between them. Furthermore, the invention is not limited to the use of telescoping rings adapted for relative lateral movement. The friction elements may, for example, extend radially between the driving and driven members or they may be arranged in a variety of other ways. Vertical disposition of the two series of rings 64 and 65 which serve to connect the driving and driven members 66 and 67, respectively, is illustrated in Figure 7. It is to be understood that the terms employed in the description of the invention are not used for the purpose of imposing any limitations thereon but are employed solely for the purpose of disclosing one form of the invention. Where the term "mechanical advantage" is employed herein as applied to the co-action between the faces of the friction rings it should be understood to signify a leverage effect, i. e. the production of a greater pressure between the rings to set up friction than the force which is shifting the rings to establish this pressure.

What I claim is:

1. In a device of the class described a plurality of outer friction elements formed of forged steel, a plurality of co-operating inner friction elements formed of cast iron, said outer and inner elements having co-operating camming surfaces co-acting at a mechanical advantage, and means for shifting said surfaces relatively axially to simultaneously set up tensile stresses in all of said outer elements and compressional stresses in all of said inner elements.

2. In a device of the class described a plurality of co-operating unbroken, annular friction elements having surfaces in wedging relation co-acting at a mechanical advantage, certain of said elements being formed of material having high resilience under compressional forces, and means for shifting said elements relatively axially to simultaneously compress and reduce the mean diameter of all of said certain elements and create friction between co-operating surfaces.

3. In a device of the class described a plurality of co-operating unbroken friction elements having surfaces in wedging relation co-acting at a mechanical advantage, certain of said elements being formed of material having high resilience under tensile forces, and means for shifting said elements relatively axially to simultaneously expand all of said certain elements and create friction between co-operating surfaces.

4. In a device of the class described a plurality of complete outer friction rings, a plurality of complete inner friction rings, said outer and inner rings being of circular cross section and having co-operating inclined faces, and means for producing bodily relative movement between all of said rings to produce a camming action thereby varying the diameter of the rings and producing friction between said faces.

5. In a device of the class described a plurality of complete outer friction rings, a plurality of complete inner friction rings, said outer and inner rings having co-operating inclined faces co-acting at a mechanical advantage, yielding means for producing bodily relative movement between said rings to bring about a camming action subjecting said outer rings to tensile forces and said inner rings to compressive forces and producing friction between said faces, and means for opposing said yielding means to permit disengagement of said co-operating faces.

6. In a device of the class described a plurality of sets of inner and outer friction rings of circular cross section, said rings having co-operating camming faces inclined at a smaller angle to the axis of said rings than to a plane perpendicular to said axis, and means for producing relative axial movement between all of said rings to produce a camming action tending to compress the inner rings and expand the outer rings and create friction between said faces.

7. In a device of the class described a plurality of outer friction rings, a plurality of inner friction rings partly telescoping within said outer rings, co-operating camming surfaces formed on said outer and inner rings co-acting at a mechanical advantage upon relative axial movement, means for axially forcing said surfaces into co-operation, and means for opposing said first mentioned means and permitting instantaneous disengagement of said surfaces due to the resilience of the rings.

8. In a device of the class described a plurality of friction elements having co-operating friction surfaces, means for shifting said elements axially relatively to each other, said surfaces having a wedging action at a mechanical advantage during such relative movement which compresses certain of the elements and stretches others to store molecular energy in the elements, and a housing enclosing said elements and adapted to contain a lubricant therefor.

9. In a device of the class described a driving member, a driven member, an unbroken friction ring connected for rotary movement with one of said members, a second unbroken friction ring connected for rotary movement with the other of said members, said second ring being partly within said first mentioned ring, said rings having annular surfaces in wedging relation at a mechanical advantage with each other upon relative axial movement, and means for shifting said rings relatively to each other thereby stretching the first mentioned ring to produce a substantially complete peripheral contact between the rings and setting up frictional forces between them.

10. In a friction clutch construction a pair of coaxial friction elements, each of said elements comprising an endless, unbroken band having a large central opening and being supported to have a slight free radial movement, said elements having co-operating camming surfaces co-acting at a mechanical advantage upon relative axial movement, and means for shifting said elements axially relatively to each other to vary a dimension of the elements to store energy within said elements and create friction between said surfaces.

11. In a device of the class described a driving member, a driven member, a plurality of friction elements of circular cross section mounted between said members, said elements having cooperating wedging surfaces co-acting at a mechanical advantage and arranged to be brought into engagement around their entire circumference, certain of said elements being positively connected for rotational movement with one of said members and other of said elements being positively connected for rotational movement with the other member, and means for shifting said friction elements relative to each other to produce a wedging action tending to vary the mean length of all of said elements and thus store molecular or stress-strain energy therein and create friction therebetween.

12. In a device of the class described a driving member, a driven member, friction rings circular in cross section and formed of resilient material between said members, said rings having wedging surfaces co-acting at a mechanical advantage and arranged to be brought into engagement around their entire circumference, and means for shifting certain of said rings relative to both of said members and relative to each other to produce a wedging action serving to vary the mean circumference of all of said rings and thus store molecular or stress-strain energy in the rings and create friction between the same.

13. In a device of the class described a driving member, a driven member, a plurality of complete unbroken friction rings mounted between said members, and means for shifting said rings axially relatively to each other, said rings interacting around their entire circumferences upon such axial shifting to vary their mean circumferences and store energy therein, thereby creating frictional forces between them to transmit the driving forces between said members.

14. In a friction clutch construction a plurality of series of unbroken annular friction elements having co-operating camming surfaces co-acting at a mechanical advantage around the entire circumference, and means for shifting said surfaces relatively to each other to subject one series of said elements to compressional forces only and another series of said elements to expanding forces only and thereby bringing the cooperating surfaces of said elements into substantially full peripheral contact.

GUSTAVE FAST.